US011025473B2

(12) United States Patent
Sadek et al.

(10) Patent No.: US 11,025,473 B2
(45) Date of Patent: Jun. 1, 2021

(54) TECHNIQUES FOR USE IN REVERSE TIME ALIGNMENT

(71) Applicant: QUALCOMM Incorporated, San Diego, CA (US)

(72) Inventors: Ahmed Sadek, San Diego, CA (US); Taesang Yoo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/707,595

(22) Filed: Sep. 18, 2017

(65) Prior Publication Data

US 2018/0115453 A1    Apr. 26, 2018

Related U.S. Application Data

(60) Provisional application No. 62/411,995, filed on Oct. 24, 2016.

(51) Int. Cl.
*H04L 27/26* (2006.01)
*H04W 56/00* (2009.01)
(Continued)

(52) U.S. Cl.
CPC ........ *H04L 27/2656* (2013.01); *H04J 3/0682* (2013.01); *H04W 56/001* (2013.01);
(Continued)

(58) Field of Classification Search
CPC .. H04L 27/2656; H04J 3/0682; H04W 56/001
See application file for complete search history.

(56) References Cited

U.S. PATENT DOCUMENTS 9,642,105 B2 *  5/2017  Patel ................. H04W 56/0015
9,750,044 B2    8/2017  Xu et al.
(Continued)

FOREIGN PATENT DOCUMENTS

CN    104812049 A    7/2015
CN    105743633 A    7/2016
(Continued)

OTHER PUBLICATIONS

Blackberry UK Limited: "On Solutions for Radio-Based Synchronization", 3GPP Draft; R1-135551, 3rd Generation Partnership Project (3GPP), Mobile Competence Centre, 650, Route Des Lucioles, F-06921, Sophia-Antipolis Cedex, France, vol. RAN WG1, No. San Francisco, USA; Nov. 13, 2013, XP050735217, Retrieved from the Internet: URL:http://www.3gpp.org/ftp/Meetings_3GPP_SYNC/RAN/RAN1/Docs/ [retrieved on Nov. 13, 2013], 4 pages.
(Continued)

*Primary Examiner* — Siming Liu
(74) *Attorney, Agent, or Firm* — Arent Fox, LLP and Qualcomm, Incorporated (57) ABSTRACT

The present disclosure describes a method, an apparatus, and a computer-readable medium for use in providing reverse time alignment in a wireless network. For example, the method may include obtaining a first timing value from a serving node and a second timing value from each of one or more non-serving nodes of the UE, computing one or more timing differences between the first timing value and each of one or more second timing values, and reporting the one or more timing differences to the serving node. Additionally, the disclosure describes a method, an apparatus and a computer-readable medium for use in providing time alignment in a coordinated multi-point (CoMP) transmission network by obtaining of a CoMP transmission network timing information from a plurality of user equipments
(Continued)

(UEs) and storing the timing information for each of the plurality of UEs for communicating with the first node.

26 Claims, 7 Drawing Sheets

(51) Int. Cl.
*H04J 3/06* (2006.01)
*H04B 7/26* (2006.01)
*H04L 7/00* (2006.01)

(52) U.S. Cl.
CPC ....... *H04W 56/0045* (2013.01); *H04B 7/2665* (2013.01); *H04B 7/2668* (2013.01); *H04B 7/2671* (2013.01); *H04L 7/007* (2013.01)

(56) References Cited

U.S. PATENT DOCUMENTS

| | | | |
|---|---|---|---|
| 2010/0172340 A1* | 7/2010 | Muharemovic | H04W 56/0065 370/350 |
| 2011/0085491 A1 | 4/2011 | Tynderfeldt et al. | |
| 2012/0258752 A1* | 10/2012 | Liao | H04W 56/00 455/509 |
| 2013/0115944 A1 | 5/2013 | Tavildar et al. | |
| 2013/0229953 A1* | 9/2013 | Nam | H04W 72/0426 370/280 |
| 2013/0344878 A1 | 12/2013 | Whinnett | |
| 2016/0050624 A1* | 2/2016 | Tirronen | H04W 52/0216 370/311 |
| 2017/0006569 A1 | 1/2017 | Bergstrom et al. | |
| 2017/0064690 A1* | 3/2017 | Nord | H04W 72/048 |
| 2017/0142674 A1* | 5/2017 | Centonza | H04W 56/0025 |

FOREIGN PATENT DOCUMENTS

| | | | |
|---|---|---|---|
| EP | 2391159 A1 * | 11/2011 | ........ H04W 56/0045 |
| WO | 2014182493 A1 | 11/2014 | |

OTHER PUBLICATIONS

International Search Report and Written Opinion—PCT/US2017/052220—ISA/EPO—dated Dec. 1, 2017.

* cited by examiner

TECHNIQUES FOR USE IN REVERSE TIME ALIGNMENT

CLAIM OF PRIORITY

The present application for patent claims priority to U.S. Provisional Patent Application No. 62/411,995, filed Oct. 24, 2016, entitled "Reverse Time Alignment," which is assigned to the assignee hereof, and hereby expressly incorporated by reference herein.

BACKGROUND

The present disclosure relates generally to communication systems, and more particularly, to techniques for use in synchronization in wireless networks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, wideband CDMA (W-CDMA) systems, time division multiple access (TDMA) systems, frequency division multiple access (FDMA) systems, orthogonal frequency division multiple access (OFDMA) systems, wide band single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

In licensed spectrum, a base station (or a cell, node, etc.) can listen to other base stations, obtain timing, and perform network listen based synchronization. For example, a small cell base station may listen to one or more macro cell base stations and synchronize its timing to the timing received from one or more macro cell base stations. In unlicensed or shared spectrum, better coexistence and spectrum sharing can be achieved if different nodes have common timing. However, in the absence of global positioning system (GPS) connected anchor base stations (e.g., macro cell base stations) that may provide time for synchronization in the unlicensed or shared spectrum, timing lag may accumulate across hops in a network listen based synchronization and may affect network performance.

Therefore, there is a desire for a method and an apparatus for synchronization or time alignment in the unlicensed/shared spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one example, a method for a reverse time alignment in a wireless network at a UE is provided. The method includes obtaining, at a user equipment (UE), a first timing value from a serving node and a second timing value from each of one or more non-serving nodes of the UE; computing, at the UE, one or more timing differences between the first timing value and each of one or more second timing values; and reporting, by the UE, the one or more timing differences to the serving node.

In another example, an apparatus for a reverse time alignment in a wireless network at a UE is provided. The apparatus includes means for obtaining, at a user equipment (UE), a first timing value from a serving node and a second timing value from each of one or more non-serving nodes of the UE; means for computing, at the UE, one or more timing differences between the first timing value and each of one or more second timing values; and means for reporting, by the UE, the one or more timing differences to the serving node.

In a further example, an apparatus for a reverse time alignment in a wireless network at a UE is provided. The apparatus includes a memory and at least one processor coupled with the memory, wherein the at least one processor and the memory are configured to obtain, at a user equipment (UE), a first timing value from a serving node and a second timing value from each of one or more non-serving nodes of the UE; compute, at the UE, one or more timing differences between the first timing value and each of one or more second timing values; and report, by the UE, the one or more timing differences to the serving node.

Additionally, in another example, a computer readable medium storing computer executable code for reverse time alignment in a wireless network at a UE is provided. The computer readable medium includes code for obtaining, at a user equipment (UE), a first timing value from a serving node and a second timing value from each of one or more non-serving nodes of the UE; code for computing, at the UE, one or more timing differences between the first timing value and each of one or more second timing values; and code for reporting, by the UE, the one or more timing differences to the serving node.

Moreover, in another additional example, a method, an apparatus, and a computer-readable medium for time alignment in a coordinated multi-point (CoMP) transmission network is described. The example method includes obtaining, at a first node of the CoMP transmission network, timing information from a plurality of user equipments (UEs), wherein the timing information received from each UE of the plurality of UEs includes a difference in timing between a first timing received at the UE from the first node and a second timing received at the UE from a second node of the CoMP transmission network; and storing, at the first node, separate timings for each of the plurality of UEs for communicating with the first node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure provides an example method and an apparatus for reverse time alignment in a wireless network. The example method includes a UE obtaining timing values from a serving node and one or more non-serving nodes. The received timing values may be different from one another as time lag may accumulate across hops in network listen based synchronization. The UE then computes one or more time differences based on the timing value received from the serving node and the non-serving nodes and reports the time differences to the serving node. In one implementation, the serving node may update the timing value at the serving node based on the time differences sent from the UE. In another implementation, the UE may receive the updated timing values and synchronize the timing value at the UE to the updated timing value received from the serving node.

Figure 1:
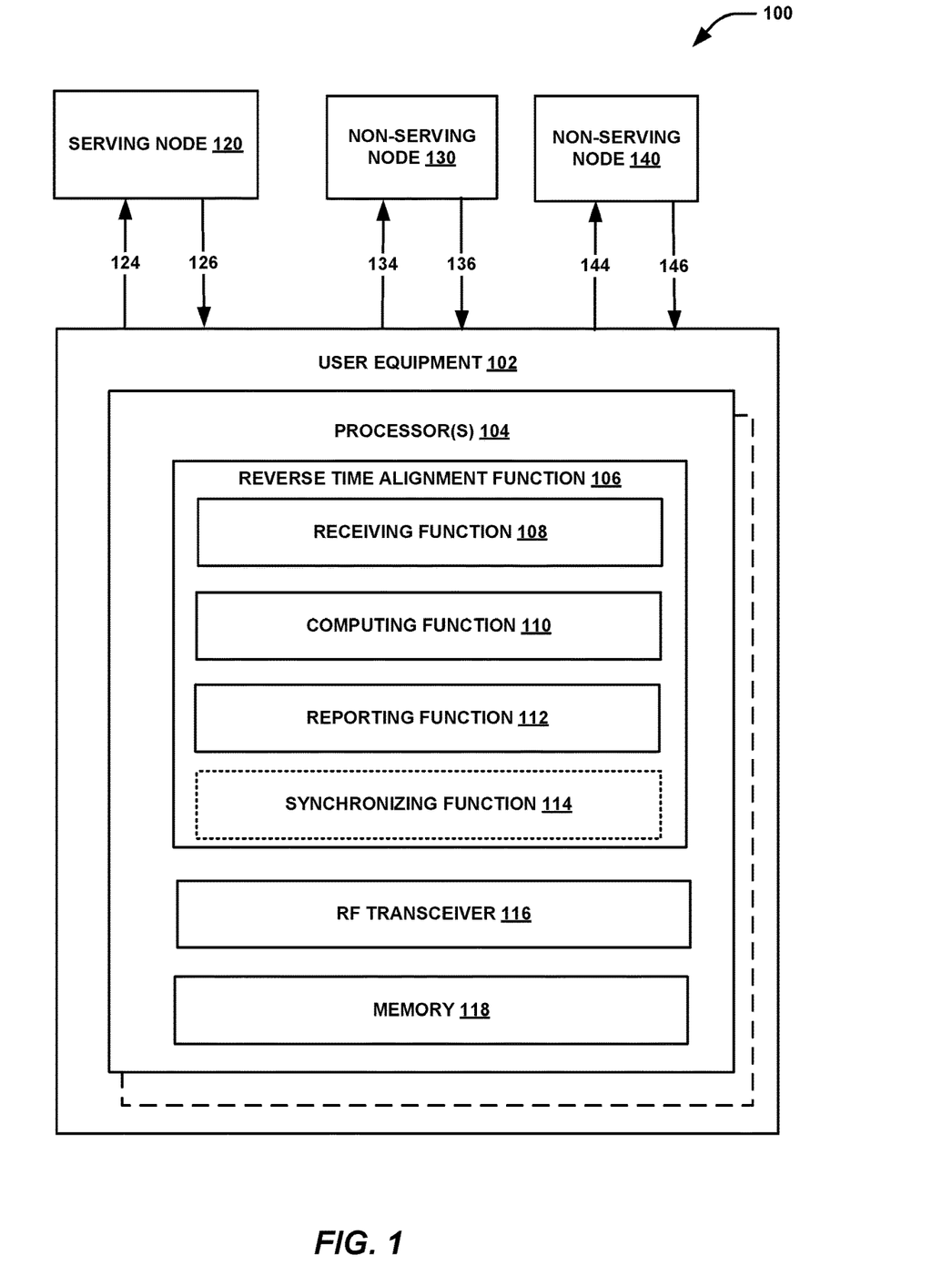
FIG. 1 is an example schematic diagram of a wireless communications system including a user equipment having an aspect of a reverse time alignment function for reverse time alignment in a wireless network.

FIG. 1 illustrates an example schematic diagram of a wireless communications system 200 including a user equipment having an aspect of a reverse time alignment function for reverse time alignment in a wireless network. Referring to FIG. 1, in an aspect, a wireless communication system 100 includes an user equipment (UE) 102, one or more processors 104, and/or a reverse time alignment function 106 running on processor 104 (or processors 104 in a distributed computing environment) for reverse time alignment in a wireless network. In an aspect, the UE 102 and/or reverse time alignment function 106 may further include a receiving function 108 to obtain (e.g., receive or estimate) a first timing value from a serving node and one or more second timing values from one or more non-serving nodes, a computing function 110 to compute one or more timing differences between the first timing value and each of one or more second timing values, a reporting function 112 to report the one or more timing differences to the serving node. In an additional or optional aspect, the UE 102 and/or reverse time alignment function 106 may further include a synchronizing function 114 to synchronize timing at UE 102 to a third timing value obtained from the serving node. The UE 102 may include a RF transceiver 116 and/or a memory 118 for reverse time alignment.

As illustrated in FIG. 1, UE 102 may communicate with one or more nodes. The nodes may be one serving node, e.g., serving node 120, and one or more non-serving nodes, e.g., non-serving nodes 130 and 140. Serving node 120 and non-serving nodes 130, 140 may be neighbor nodes. In an aspect, UE 102 may communicate with serving node 120 via one or more over-the-air links, e.g., uplink (UL) 124 and/or downlink (DL) 126. In an aspect, UL 124 is generally used for communication from UE 120 to serving node 120 and the DL 126 is generally used for communication from serving node 120 to UE 102. Additionally, UE 102 may communicate with non-serving node 130 via one or more over-the-air links, e.g., UL 134/DL 136 and/or uplink (UL) or non-serving node 140 via one or more over-the-air links 144/146.

UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Serving node 120 and/or non-serving nodes 130 and/or 140 may be a base station (BS) or Node B or eNodeB, a macro cell, a small cell (e.g., a femtocell, or a pico cell), a relay, a peer-to-peer device, etc. In an example aspect, the nodes may operate according to wireless local area network (WLAN) specification as defined in IEEE 802.11 and/or may operate according to Wideband Code Division Multiple Access (W-CDMA), Code Division Multiple Access (CDMA), Time Division Synchronous Code Division Multiple Access (TD-SCDMA), Long Term Evolution (LTE), Global System for Mobile Communications (GSM), 5G (NR) standard as defined in 3GPP Specifications.

Figure 2:
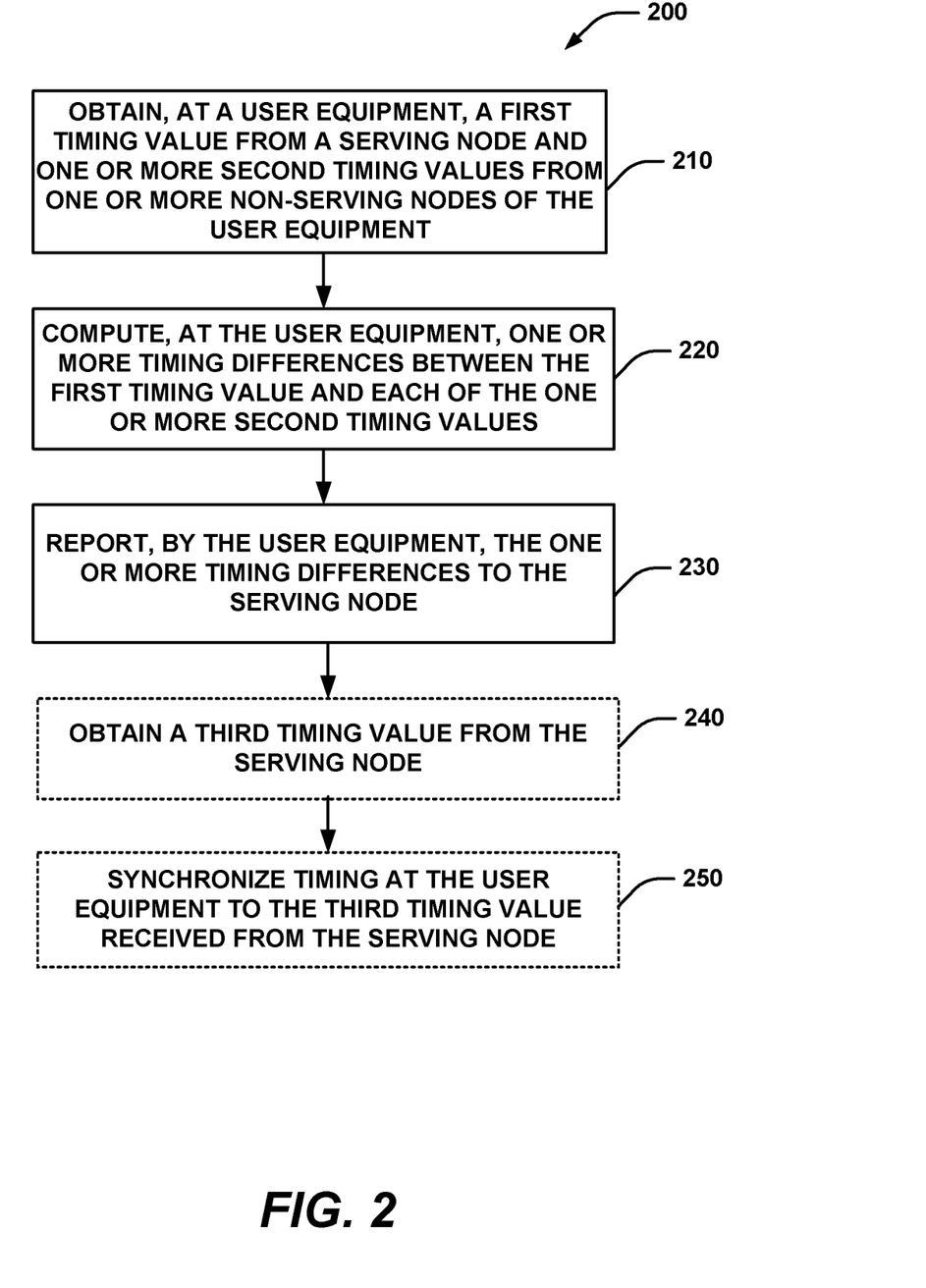
FIG. 2 is a message flow diagram illustrating aspects of an example method in aspects of the present disclosure.

FIG. 2 illustrates an example methodology 200 for reverse time alignment in a wireless network.

In an aspect, at block 210, methodology 200 may include obtaining, at a user equipment (UE), a first timing value from a serving node and a second timing value from each of one or more non-serving nodes of the UE. For example, in an aspect, UE 102 and/or reverse time alignment function 106 may include a receiving function 108, such as a specially programmed processor module, or a processor executing specially programmed code stored in a memory, to obtain at UE 102 a first timing value, e.g., $T_S$, from serving node 120 (or a node UE 102 is camped on or associated with) and a second timing value from each of one or more non-serving nodes of the UE, e.g., $T_{NS1}$ and $T_{NS2}$ from non-serving nodes 130 and 140, respectively. $T_S$ may be defined as a timing value obtained from serving node 120, $T_{NS1}$ may be defined as a timing value obtained from a non-serving node 130, and/or $T_{NS2}$ may be defined as a timing value obtained another non-serving node 140.

UE 102 may obtain the timing values (e.g., $T_S$, $T_{NS1}$, and/or $T_{NS2}$) from a serving node (e.g., serving node 120) and/or one or more non-serving nodes (e.g., non-serving nodes 130 and/or 140) via synchronization signals that may be broadcasted from the nodes. For instance, in LTE, the synchronization signals may be primary or secondary synchronization signals. In an additional aspect, UE 102 may obtain the timing values from system information blocks (SIBs) that are broadcasted from the nodes. In one implementation, a SIB may include a coordinated universal time (UTC). In an additional aspect, UE 102 may estimate the timing values (e.g., $T_S$, $T_{NS1}$, and/or $T_{NS2}$) from signal waveforms transmitted by the serving and/or the non-serving nodes. The signal waveforms, which allow a UE to distinguish between nodes, may be synchronization or pilot signals transmitted by serving and non-serving nodes and the estimating may be performed using signal processing techniques implemented at a receiver of the UE.

At block 220, methodology 200 may include computing, at the UE, one or more timing differences between the first timing value and each of the one or more second timing values. For example, in an aspect, UE 102 and/or reverse time alignment function 106 may include a computing function 108, such as a specially programmed processor module, or a processor executing specially programmed code stored in a memory, to compute one or more timing differences (e.g., timing deltas ($T_D$)) between the first timing value (e.g., $T_S$) and each of one or more second timing values (e.g., $T_{NS1}$, $T_{NS2}$, etc.). For example, UE 102 and/or reverse time alignment function 106 may compute timing differences between the serving node 120 and non-serving node 130 (e.g., $T_{D1}$) and/or the serving node 120 and the non-serving node 140 (e.g., $T_{D2}$) as shown below:

$$T_{D1}=T_{NS1}-T_S$$

$$T_{D2}=T_{NS2}-T_S$$

At block 230, methodology 200 may include reporting the one or more timing differences to the serving node. For example, in an aspect, UE 102 and/or reverse time alignment function 106 may include a reporting function 112, such as a specially programmed processor module, or a processor executing specially programmed code stored in a memory, to report the one or more timing differences, e.g., $T_{D1}$ and/or $T_{D2}$ to serving node 120.

UE 102 may report the one or more timing differences, which can also be referred to as "timing deltas," to the serving node so that the serving node may adjust timing of the serving node. That is, serving node 120 may configure the timing at serving node 120 based on timing deltas obtained from UE 102. In one aspect, the timing differences may be reported via a message from UE 102 to serving node 120. The message may be a control channel or a data channel message. In another aspect, the message may be a "timing alignment command" or "TA command." In an additional aspect, UE 102 may report timing differences of non-serving nodes 130, 140 UE 102 observes only if the timing differences of the non-serving nodes 130, 140 are within a certain range, as defined, for example, by a network operator.

Additionally, UE 102 may combine the timing differences obtained from multiple non-serving nodes, e.g., nodes 130 and 140, into one (or more) messages for reporting to the serving node 120. For example, serving node 120 may obtain timing differences, via individual or combined messages, from multiple UEs 102 served by serving node 120. Once serving node 120 obtains the timing differences, serving node 120 decides whether to adjust the timing of the serving node 120. In one implementation, determining whether to adjust the timing at serving node 120 may be defined by a network operator by configuring at a node level, a cluster level, or a network level.

In addition to reporting the timing differences to serving node 120, UE 102 may also report additional information to assist serving node 120 in determining propagation delays (e.g., $D_S$, $D_{NS1}$, $D_{NS2}$, etc.) from serving node 120 and/or non-serving nodes 130 and 140. For example, UE 102 may report additional information, e.g., path loss, received signal strength indicator (RSSI), or other metrics related to distance to serving node 120. Serving node 120, upon receiving the additional information (e.g., one or more of path loss, RSSI, other metrics, etc.) may estimate the propagation delays associated with serving node 120 and/or non-serving nodes 130, 140, and adjust the timing differences. For instance, timing adjustments, e.g., $T_{D1(ADJ)}$ and $T_{D2(ADJ)}$, may be adjusted based on the propagation delays (e.g., propagation delay estimates) of the serving and the non-serving nodes as shown below:

$$T_{D1(ADJ)}=T_{D1}-D_{NS1}+D_S$$

$$T_{D2(ADJ)}=T_{D2}-D_{NS2}+D_S$$

In another implementation, UE 102 may estimate the propagation delays associated with serving node 120 and/or non-serving nodes 130, 140, and may apply them to the timing differences prior to reporting to serving node 120. In other words, UE 102 may determine the timing adjustments, e.g., $T_{D1(ADJ)}$ or $T_{D2(ADJ)}$, and report them to serving node 120 and/or non-serving nodes 130, 140.

UE 102 may report the timing differences to serving node 102 when UE 102 is in a connected mode or an idle mode. In one implementation, when UE 102 is in the connected mode, UE 102 may report the timing differences to the serving node 120 using uplink (UL) control or data channels. For example, the timing differences may be reported via a physical uplink control channel (PUCCH) or as media access control (MAC) control elements via a physical uplink shared channel (PUSCH). In another implementation, when UE 102 is in an idle mode, UE 102 may wake up (e.g., from sleep mode), transition to connected mode, and/or report the timing differences to the serving node 120 as described above.

Optionally, at block 240, methodology 200 may include receiving a third timing value from the serving node. For example, in an aspect, UE 102 and/or reverse time alignment function 106 may include a receiving function 108, such as a specially programmed processor module, or a processor executing specially programmed code stored in a memory, to obtain a third timing value from serving node 120. The third timing value may be a revised or updated timing from serving node 120 which may be determined by serving node 120 based on the timing differences reported by UE 102 to serving node 120.

Optionally, at block 250, methodology 200 may include synchronizing timing at the UE to the third timing value obtained from the serving node. For example, in an aspect, UE 102 and/or reverse time alignment function 106 may optionally include synchronizing function 114, such as a specially programmed processor module, or a processor executing specially programmed code stored in a memory, to synchronize timing at the UE, e.g., UE 102, to the third timing value obtained from serving node 120. The mechanism described above synchronizes the nodes and improves the performance.

Figure 3:
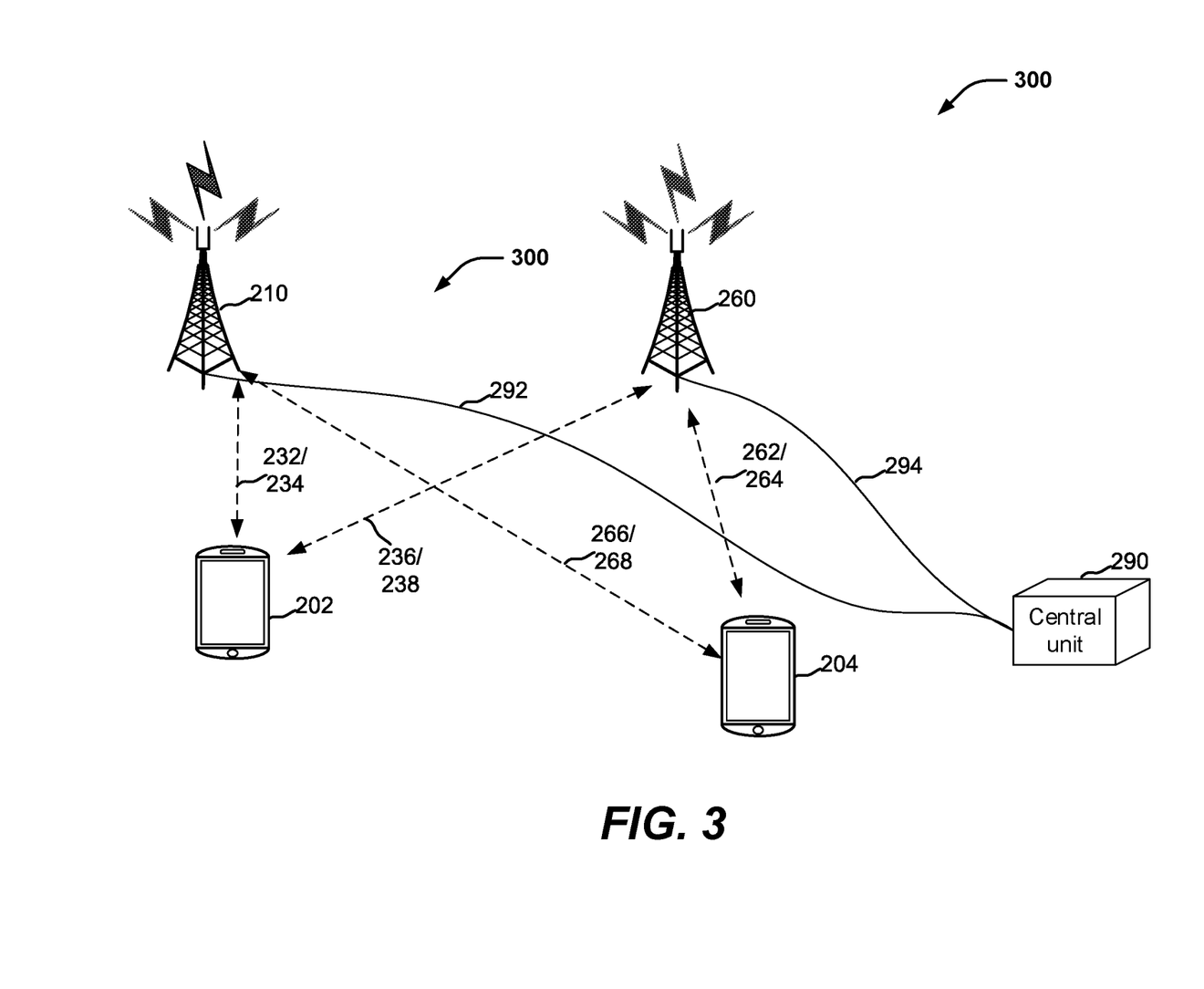
FIG. 3 is an example schematic diagram of coordinated multi-point (CoMP) transmission in aspects of the present disclosure.

FIG. 3 illustrates an example CoMP transmission system 300 with two nodes (or transmission points/TPs), e.g., nodes 210 and 260, with each of the nodes serving multiple UEs simultaneously, e.g., UEs 202 and 204. In such a CoMP transmission system, different UEs may recommend different timing alignments for the nodes. FIG. 3 also includes a central unit 290 which may perform the functions of a centralized network manager, e.g., operations, administration, and management.

For example, in CoMP transmission system 300, UE 202 may obtain timing (or timing information) from nodes 210 and 260, simultaneously. As UE 202 is farther (e.g., from a distance perspective) from node 260 compared to node 210, UE 202 may experience time lag with regards to communications with node 260. The time lag experienced at UE 202 may be due to higher propagation delay between UE 202 and node 260 vs propagation delay between UE 202 and node 210. Similarly, as UE 204 is farther (e.g., from a distance perspective) from node 210 as compared to node 260, UE 204 may experience time lag with regards to communications with node 210. The time lag experienced at UE 204 may be due to higher propagation delay between UE 204 and node 210 vs propagation delay between UE 204 and node 260. Therefore, the multipath delay experienced by a UE in a CoMP transmission system may be larger due to transmissions from multiple nodes/TPs which may not be a problem if the cyclic prefix (CP) is large enough. However, the configuration of CP values is generally limited as higher values may affect network performance.

For instance, the UEs may compute timing differences, for example, as described above in reference to FIGS. 1 and 2, and report the timing differences to the nodes. For example, UE 202 may compute the timing differences (e.g., differences in the propagation delays) between nodes 210 and 260 and report the timing differences to nodes 210 and 260. Similarly, UE 204 may compute the timing differences between nodes 210 and 260 and report the timing differences to nodes 210 and 260. In one implementation, nodes 210 and/or 260, upon receiving the timing differences from UEs 202 and/or 204, may maintain (e.g., store, manage, etc.) timing specific to a UE. That is, node 210 may maintain one timing for communications with UE 202 and another timing for communications with UE 204. Similarly, node 260 may maintain one timing for communications with UE 202 and another timing for communications with UE 204.

In an aspect, each node, e.g., node 210 or 260, may maintain separate timing for different UEs. For instance, node 210 may maintain separate timings for UE 202 and 204 and may use the separate timings for communications with the specific UE. For example, node 210 may maintain timings, $T_{202}$ and $T_{204}$ at node 210 and may use $T_{202}$ for communications with UE 202 and/or may use $T_{204}$ for communications with UE 204. Similarly, node 260 may maintain timings, $T_{202'}$ and $T_{204'}$ at node 260 and may use $T_{202'}$ for communications with UE 202 and/or may use $T_{204'}$ for communications with UE 204. The use of separate timings reduces multipath delays in CoMP transmission networks and/or may improve network performance.

Figure 4:
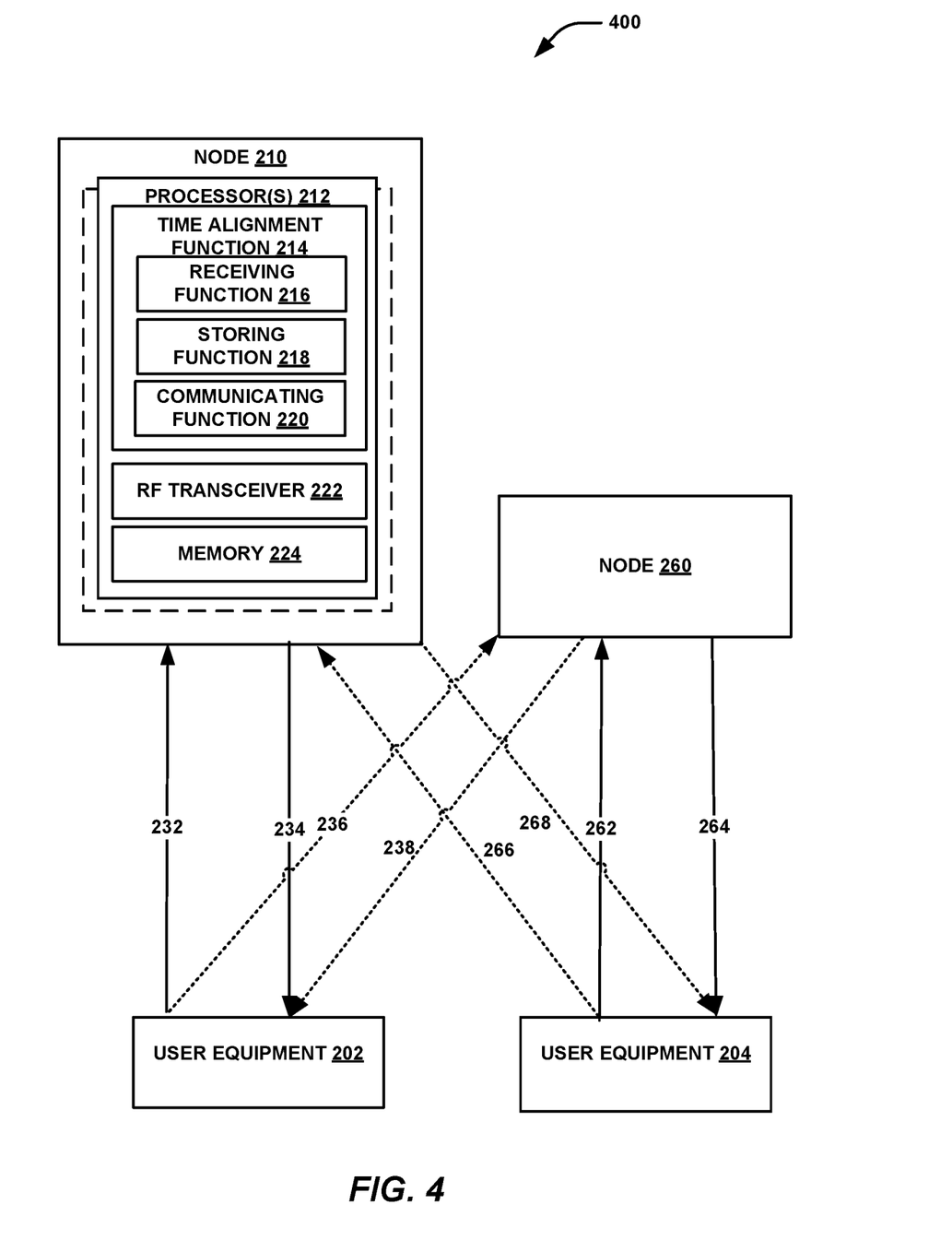
FIG. 4 is an example schematic diagram of a wireless communications system including a node having an aspect of a time alignment function for time alignment in a coordinated multi-point (CoMP) transmission network.

Referring to FIG. 4, in an aspect, a CoMP transmission system 400 includes node 210, one or more processors 212, and/or a time alignment function 214 running on processor 212 (or processors 212 in a distributed computing environment) for time alignment. In an aspect, node 210 and/or time alignment function 214 may further include a receiving function 216 to obtain timing information from a plurality of user equipments (UEs) and/or a storing function 218 to store, at node 210, separate timings for each of the plurality of UEs for communicating with node 210. In an additional or optional aspect, node 210 and/or time alignment function 214 may further include a communicating function 220 to communicate with the plurality of user equipments using the separate timings stored for each of the plurality of UEs. Further, node 210 may include a RF transceiver 222 and/or a memory 224 for time alignment in CoMP transmission networks.

As illustrated in FIG. 4, node 210 may communicate with one or more UEs 202, 204. In an aspect, node 210 may communicate with UE 202 via one or more over-the-air links, e.g., uplink (UL) 232 and/or downlink (DL) 234. In an aspect, UL 232 is generally used for communication from UE 202 to node 210 and/or DL 234 is generally used for communication from node 210 to UE 202. Additionally, node 210 may also communicate with UE 204 via one or more over-the-air links, e.g., UL 266/DL 268. Similarly, node 260 may communicate with one or more UEs. In an aspect, node 260 may communicate with UE 204 via one or more over-the-air links, e.g., uplink (UL) 262 and/or downlink (DL) 264. In an aspect, UL 262 is generally used for communication from UE 204 to node 260 and/or DL 264 is generally used for communication from node 260 to UE 204. Additionally, node 260 may also communicate with UE 202 via one or more over-the-air links, e.g., UL 236/DL 238.

Figure 5:
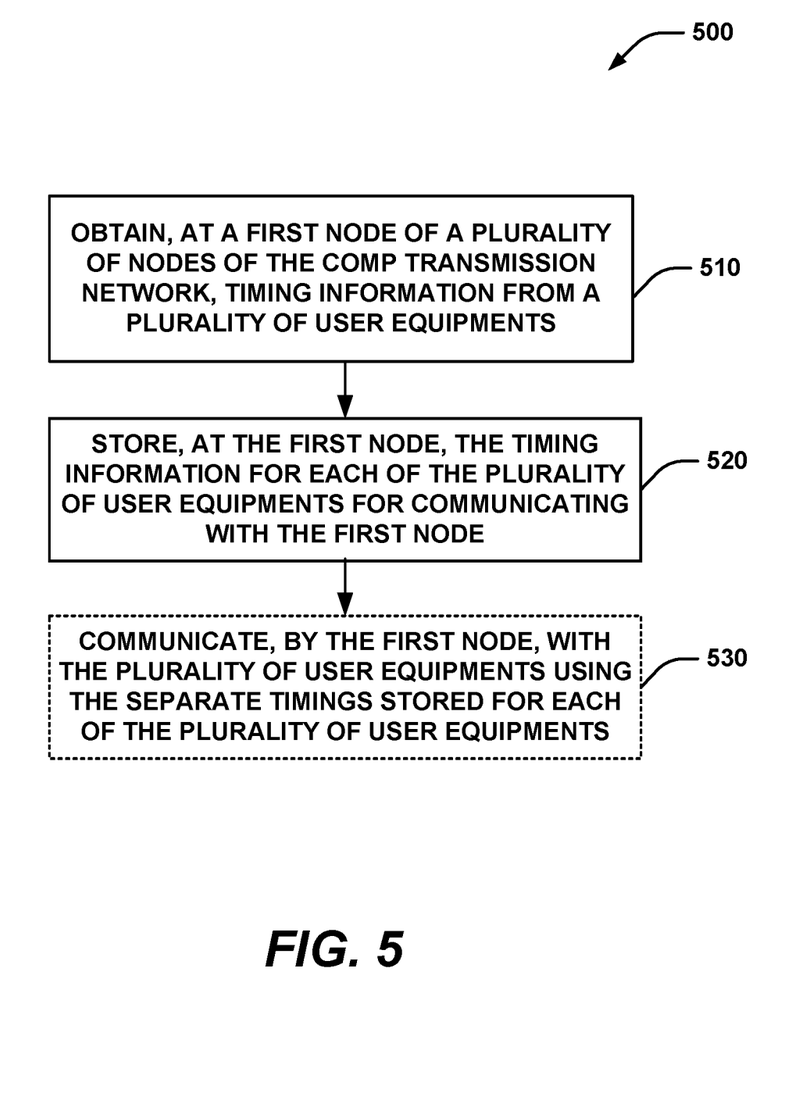
FIG. 5 is an additional message flow diagram illustrating aspects of an example method in aspects of the present disclosure.

FIG. 5 illustrates an example methodology 500 for time alignment in a coordinated multi-point (CoMP) transmission network.

In an aspect, at block 510, methodology 500 may include obtaining, at a first node of a plurality of nodes of the CoMP transmission network, timing information from a plurality of user equipments (UEs), wherein the timing information for each UE of the plurality of UEs indicates a difference in timing between a first timing value received at the UE from the first node and a second timing value received at the UE from a second node of the plurality of nodes of the CoMP transmission network. For example, in an aspect, node 210 and/or time alignment function 214 may include a receiving function 216, such as a specially programmed processor module, or a processor executing specially programmed code stored in a memory, to obtain, at node 210, timing information from a plurality of user equipments (UEs), e.g., UEs 202 and 204, wherein the timing information for each UE of the plurality of UEs indicates a difference in timing between a first timing value received at the UE from the first node and a second timing value received at the UE from a second node of the CoMP transmission network. The difference in timing received at node 210 from UE 202 may be defined as $TD_{UE202}$ ($T_{Node260}-T_{Node210}$). Similarly, the difference in timing received at node 210 from UE 204 may be defined as $TD_{UE204}$ ($T_{Node210}-T_{Node260}$).

At block 520, methodology 500 may include storing, at the first node, the timing information for each of the plurality of UEs for communicating with the first node. For example, in an aspect, node 210 and/or time alignment function 214 may include a storing function 218, such as a specially programmed processor module, or a processor executing specially programmed code stored in a memory, to store, at node 210, the timing information for each of the plurality of UEs for communicating with the first node, e.g., node 210.

For example, node 210 may store the following timings, e.g., $TD_{UE202}$ ($T_{Node260}$-$T_{Node210}$) and $TD_{UE204}$ ($T_{Node210}$-$T_{Node260}$).

Optionally, at block 530, methodology 500 may include communicating, by the first node, with the plurality of user equipments using the separate timings stored for each of the plurality of UEs. For example, in an aspect, node 210 and/or time alignment function 214 may optionally include communicating function 220, such as a specially programmed processor module, or a processor executing specially programmed code stored in a memory, to communicate, by the first node, e.g., node 210, with the plurality of user equipments, UEs 202 and 204, using the separate timings, stored for each of the plurality of UEs, e.g., e.g., $TD_{UE202}$ ($T_{Node260}$-$T_{Node210}$) and $TD_{UE204}$ ($T_{Node210}$-$T_{Node260}$). Accordingly, time alignment in CoMP transmission networks may be achieved.

Figure 6:
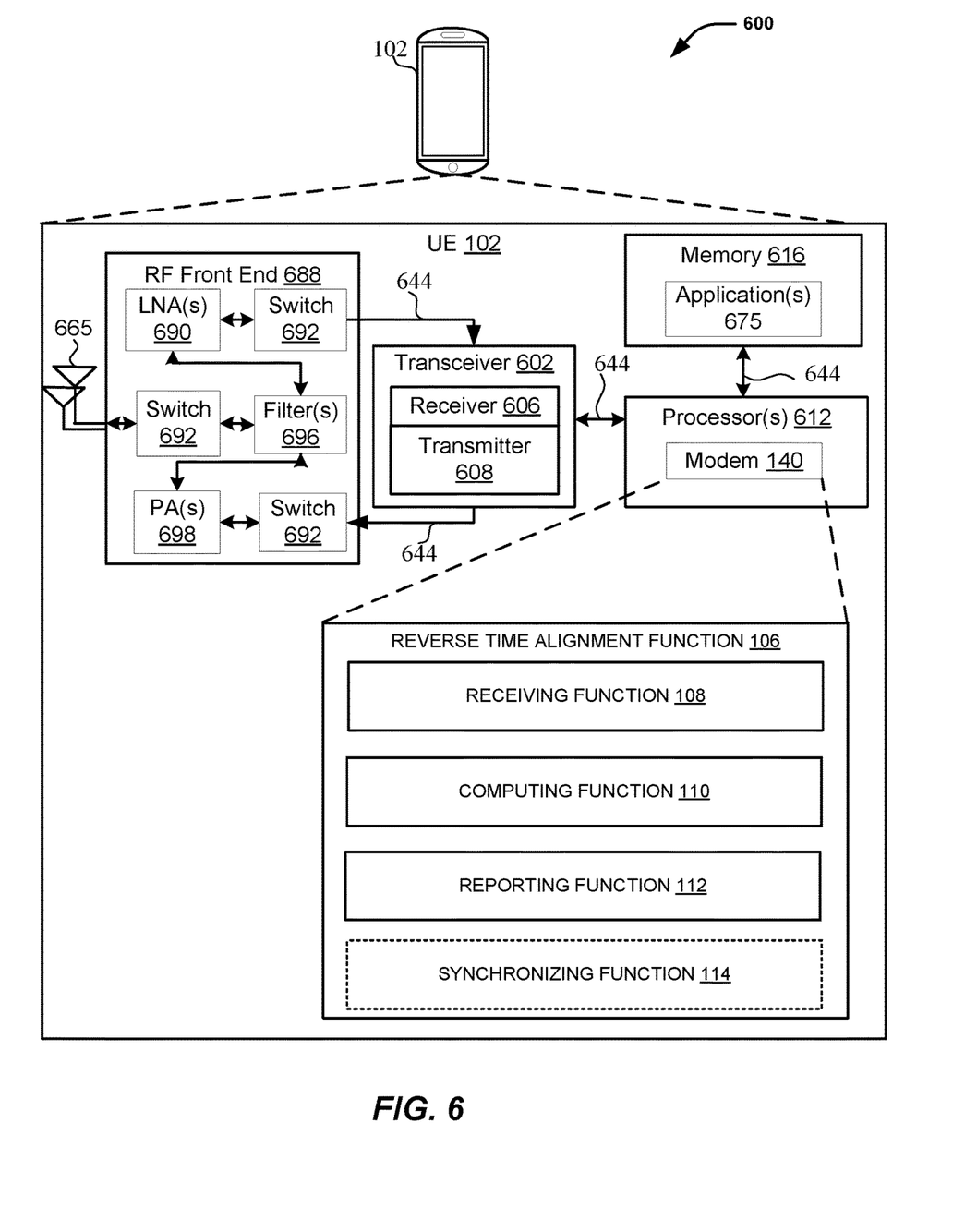
FIG. 6 is a schematic diagram of example components of the UE of FIG. 1.

Referring to FIG. 6, one example of an implementation of a UE 210 may include a variety of components, some of which have already been described above, including components such as one or more processors 612, memory 616, and transceiver 602 in communication via one or more buses 644, which may operate in conjunction with the modem 140 and reverse time alignment function 106 to achieve reverse time alignments at UE 102. Further, the one or more processors 612, modem 140, memory 616, transceiver 602, RF front end 688 and one or more antennas 665, may be configured to support voice and/or data calls (simultaneously or non-simultaneously) in one or more radio access technologies.

In an aspect, the one or more processors 612 can include a modem 140 that uses one or more modem processors. The various functions related to reverse time alignment function 106 may be included in modem 140 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with the transceiver 602. In other aspects, some of the features of the one or more processors 612 and/or modem 140 associated with reverse time alignment function 106 may be performed by the transceiver 602.

Also, the memory 616 may be configured to store data used herein and/or local versions of applications 675 or reverse time alignment function 106 and/or one or more of its subcomponents being executed by at least one processor 612. The memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, the memory 616 may be a non-transitory computer-readable storage medium that stores one or more computer-executable codes defining reverse time alignment function 106 and/or one or more of its subcomponents, and/or data associated therewith, when the UE 110 is operating at least one processor 612 to execute the reverse time alignment function 106 and/or one or more of its subcomponents.

The transceiver 602 may include at least one receiver 606 and at least one transmitter 608. The receiver 606 may include hardware, firmware, and/or software code executable by a processor for receiving data, the code comprising instructions and being stored in a memory (e.g., computer-readable medium). The receiver 606 may be, for example, a radio frequency (RF) receiver. In an aspect, the receiver 606 may receive signals transmitted by at least one node 120. Additionally, the receiver 606 may process such received signals, and also may obtain measurements of the signals, such as, but not limited to, Ec/Io, SNR, RSRP, RSSI, etc. The transmitter 608 may include hardware, firmware, and/or software code executable by a processor for transmitting data, the code comprising instructions and being stored in a memory (e.g., computer-readable medium). A suitable example of the transmitter 608 may include, but is not limited to, a RF transmitter.

Moreover, in an aspect, the UE 102 may include a RF front end 688, which may operate in communication with one or more antennas 665 and transceiver 602 for receiving and transmitting radio transmissions, for example, wireless communications transmitted by at least one base station 120 or wireless transmissions transmitted by the UE 102. The RF front end 688 may be communicatively coupled with one or more antennas 665 and can include one or more low-noise amplifiers (LNAs) 690, one or more switches 692, one or more power amplifiers (PAs) 698, and one or more filters 696 for transmitting and receiving RF signals.

In an aspect, the LNA 690 can amplify a received signal at a desired output level. In an aspect, each LNA 690 may have a specified minimum and maximum gain values. In an aspect, the RF front end 688 may use one or more switches 692 to select a particular LNA 690 and its specified gain value based on a desired gain value for a particular application.

Further, for example, one or more PA(s) 698 may be used by the RF front end 688 to amplify a signal for an RF output at a desired output power level. In an aspect, each PA 698 may have specified minimum and maximum gain values. In an aspect, the RF front end 688 may use one or more switches 692 to select a particular PA 698 and its specified gain value based on a desired gain value for a particular application.

Also, for example, one or more filters 696 can be used by the RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, the RF front end 688 can use one or more switches 692 to select a transmit or receive path using a specified filter 696, LNA 690, and/or PA 698, based on a configuration as specified by the transceiver 602 and/or processor 612.

As such, the transceiver 602 may be configured to transmit and receive wireless signals through one or more antennas 665 via RF front end 688. In an aspect, the transceiver 602 may be tuned to operate at specified frequencies such that UE 102 can communicate with, for example, one or more cells associated with one or more base stations 120, 130, 140. In an aspect, for example, the modem 140 can configure the transceiver 602 to operate at a specified frequency and power level based on the configuration of the UE 102 and communication protocol used by the modem 140.

In an aspect, the modem 140 can be a multiband-multimode modem, which can process digital data and communicate with the transceiver 602 such that the digital data is sent and received using the transceiver 602. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of UE 102 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on base station information associated with the UE 102 as provided by the network during cell selection and/or cell reselection.

Figure 7:
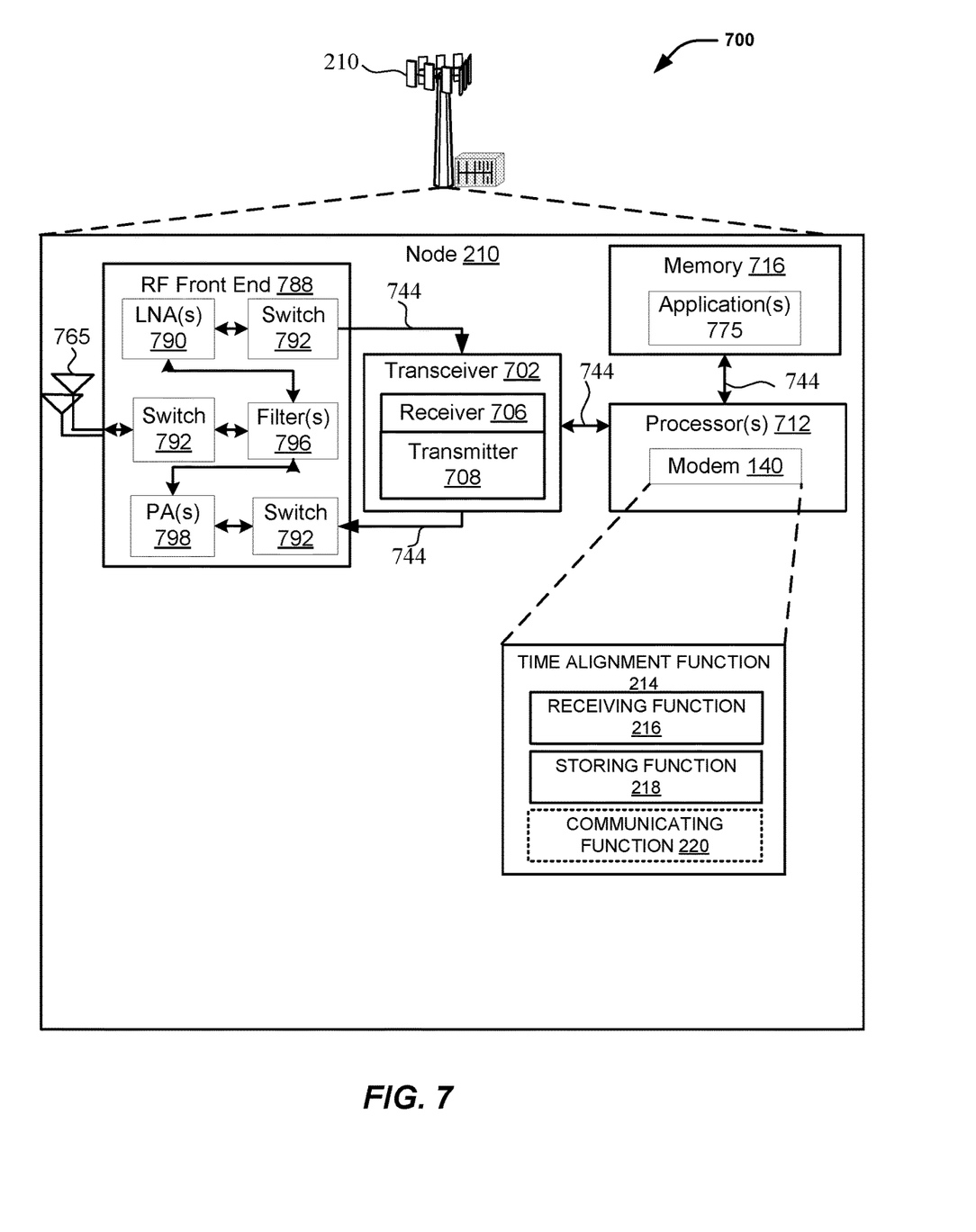
FIG. 7 is a schematic diagram of example components of the node of FIG. 4.

Referring to FIG. 7, one example of an implementation of a node 210 may include a variety of components, some of which have already been described above, including components such as one or more processors 712, memory 716 and transceiver 702 in communication via one or more buses 744, which may operate in conjunction with modem 140 and time alignment function 214 to align time in a CoMP transmission network. Further, the one or more processors 712, modem 140, memory 716, transceiver 702, RF front end 788 and one or more antennas 765, may be configured to support voice and/or data calls (simultaneously or non-simultaneously) in one or more radio access technologies.

In an aspect, the one or more processors 712 can include a modem 140 that uses one or more modem processors. The various functions related to communications component 150 may be included in modem 140 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with the transceiver 702. In other aspects, some of the features of the one or more processors 712 and/or modem 140 associated with the time alignment function 214 may be performed by the transceiver 702.

Also, the memory 716 may be configured to store data used herein and/or local versions of applications 775 or time alignment function 214 and/or one or more of its subcomponents being executed by at least one processor 712. The memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, the memory 716 may be a non-transitory computer-readable storage medium that stores one or more computer-executable codes defining time alignment function 214 and/or one or more of its subcomponents, and/or data associated therewith, when node 210 is operating at least one processor 712 to execute the time alignment function 214 and/or one or more of its subcomponents.

The transceiver 702 may include at least one receiver 706 and at least one transmitter 708. The receiver 706 may include hardware, firmware, and/or software code executable by a processor for receiving data, the code comprising instructions and being stored in a memory (e.g., computer-readable medium). The receiver 706 may be, for example, a radio frequency (RF) receiver. In an aspect, the receiver 706 may receive signals transmitted by at least one UE (e.g., UEs, 202, 204). Additionally, the receiver 706 may process such received signals, and also may obtain measurements of the signals, such as, but not limited to, Ec/Io, SNR, RSRP, RSSI, etc. The transmitter 708 may include hardware, firmware, and/or software code executable by a processor for transmitting data, the code comprising instructions and being stored in a memory (e.g., computer-readable medium). A suitable example of the transmitter 708 may include, but is not limited to, a RF transmitter.

Moreover, in an aspect, node 210 may include a RF front end 788, which may operate in communication with one or more antennas 765 and transceiver 702 for receiving and transmitting radio transmissions, for example, wireless communications transmitted by at least one UE 202 or 204 or wireless transmissions transmitted by the node 210. The RF front end 788 may be communicatively coupled with one or more antennas 765 and can include one or more low-noise amplifiers (LNAs) 790, one or more switches 792, one or more power amplifiers (PAs) 798, and one or more filters 796 for transmitting and receiving RF signals.

In an aspect, the LNA 790 can amplify a received signal at a desired output level. In an aspect, each LNA 790 may have a specified minimum and maximum gain values. In an aspect, the RF front end 788 may use one or more switches 792 to select a particular LNA 790 and its specified gain value based on a desired gain value for a particular application.

Further, for example, one or more PA(s) 798 may be used by the RF front end 788 to amplify a signal for an RF output at a desired output power level. In an aspect, each PA 798 may have specified minimum and maximum gain values. In an aspect, the RF front end 788 may use one or more switches 792 to select a particular PA 798 and its specified gain value based on a desired gain value for a particular application.

Also, for example, one or more filters 796 can be used by the RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, the RF front end 788 can use one or more switches 792 to select a transmit or receive path using a specified filter 796, LNA 790, and/or PA 798, based on a configuration as specified by the transceiver 702 and/or processor 712.

As such, the transceiver 702 may be configured to transmit and receive wireless signals through one or more antennas 765 via RF front end 788. In an aspect, the transceiver 702 may be tuned to operate at specified frequencies such that node 210 can communicate with, for example, one or more UEs, e.g., UEs 202 and 204. In an aspect, for example, the modem 140 can configure the transceiver 702 to operate at a specified frequency and power level based on the configuration of node 210 and communication protocol used by the modem 140.

In an aspect, the modem 140 can be a multiband-multimode modem, which can process digital data and communicate with the transceiver 702 such that the digital data is sent and received using the transceiver 702. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the node 210 (e.g., RF front end 788, transceiver 702) to enable transmission and/or reception of signals from the network based on a specified modem configuration. In an aspect, the modem configuration can be based on the mode of the modem and the frequency band in use. In another aspect, the modem configuration can be based on base station information associated with the node 110 as provided by the network during cell selection and/or cell reselection.

As used in this application, the terms "function," "process," "system" and the like are intended to include a computer-related entity, such as but not limited to hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device can be a process. One or more modules can reside within a module and/or thread of execution and a module may be localized on one computer and/or distributed between two or more computers. In addition, these modules can execute from various computer readable media having various data structures stored thereon. The processes may communicate by way of local and/or remote modules such as in accordance with a signal having one or more data packets, such as data from one module interacting with another module in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Several aspects of improved measurement event reporting message associated with a tune away have been presented with reference to a W-CDMA system. As those skilled in the art will readily appreciate, various aspects described throughout this disclosure may be extended to other telecommunication systems, network architectures and communication standards.

By way of example, various aspects described herein related to RACH preamble transmission may be extended to other UMTS and/or LTE and/or other systems where UE has bursty data to transmit which is not suitable for establishing a dedicated channel (e.g., during a forward access channel (CELL FACH) state)). For example, such UMTS systems may include $T_D$-SCDMA, High Speed Downlink Packet Access (HSDPA), High Speed Uplink Packet Access (HSUPA), High Speed Packet Access Plus (HSPA+) and $T_D$-CDMA. Also, such LTE and/or other systems may include Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c"

is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method for use in providing reverse time alignment in a wireless network, comprising:
    obtaining, at a user equipment (UE), a first timing value from a serving node and a second timing value from each of one or more non-serving nodes of the UE;
    computing, at the UE, timing differences between the first timing value and each of one or more second timing values;
    reporting, by the UE, the timing differences to the serving node;
    obtaining a third timing value from the serving node, wherein the third timing value is a UE specific timing value that is based on the reported timing differences and is different than the first timing value;
    synchronizing timing at the UE to the third timing value received from the serving node; and
    receiving a coordinated multi-point (CoMP) transmission at the UE from the serving node and the one or more non-serving nodes according to the third timing value,
    wherein the third timing value addresses propagation delays between at least one of the serving node and the UE or one or more non-serving nodes and the UE.

2. The method of claim 1, wherein at least one of the first timing value or the second timing value are obtained from primary or secondary synchronization signals received, respectively, from the serving node and the one or more non-serving nodes.

3. The method of claim 1, wherein at least one of the first timing value or the second timing value are obtained from system information block (SIB) messages received, respectively, from the serving node and the one or more non-serving nodes.

4. The method of claim 3, wherein at least one of the first timing value or the second timing value is obtained from the system information block (SIB) messages, and wherein system information block (SIB) messages comprise a coordinated universal time (UTC).

5. The method of claim 1, wherein at least one of the first timing value or the second timing value are obtained by the UE from measurements in an idle or a connected mode.

6. The method of claim 1, wherein the UE reports the timing differences to the serving node via an uplink control channel, a data channel, or a combination thereof.

7. The method of claim 6, wherein the uplink control channel comprises a physical uplink control channel (PUCCH) and the uplink data channel comprises a physical uplink shared channel (PUSCH).

8. The method of claim 1, further comprising:
    reporting at least one propagation delays associated with the serving node or the one or more non-serving nodes to the serving node.

9. The method of claim 1, wherein a multipath delay experienced by the UE for the CoMP transmission is less than a cyclic prefix length.

10. An apparatus for use in providing reverse time alignment in a wireless network, comprising:
    means for obtaining, at a user equipment (UE), a first timing value from a serving node and a second timing value from each of one or more non-serving nodes of the UE;
    means for computing, at the UE, timing differences between the first timing value and each of one or more second timing values;
    means for reporting, by the UE, the timing differences to the serving node;
    means for obtaining a third timing value from the serving node, wherein the third timing value is a UE specific timing value that is based on the reported timing differences and is different than the first timing value;
    means for synchronizing timing at the UE to the third timing value received from the serving node; and
    means for receiving a coordinated multi-point (CoMP) transmission at the UE from the serving node and the one or more non-serving nodes according to the third timing value,
    wherein the third timing value addresses propagation delays between at least one of the serving node and the UE or one or more non-serving nodes and the UE.

11. The apparatus of claim 10, wherein at least one of the first timing value or the second timing value are obtained from primary or secondary synchronization signals received, respectively, from the serving node and the one or more non-serving nodes.

12. The apparatus of claim 10, wherein at least one of the first timing value or the second timing value are obtained from system information block (SIB) messages received, respectively, from the serving node and the one or more non-serving nodes.

13. The apparatus of claim 12, wherein at least one of the first timing value or the second timing value is obtained from the system information block (SIB) messages, and wherein system information block (SIB) messages comprise a coordinated universal time (UTC).

14. The apparatus of claim 10, wherein at least one of the first timing value or the second timing value are obtained by the UE from measurements in an idle or a connected mode.

15. The apparatus of claim 10, wherein the UE reports the timing differences to the serving node via an uplink control channel or a data channel.

16. The apparatus of claim 15, wherein the uplink control channel comprises a physical uplink control channel (PUCCH) and the uplink data channel comprises a physical uplink shared channel (PUSCH).

17. The apparatus of claim 10, further comprising:
    means for reporting at least one propagation delays associated with the serving node or the one or more non-serving nodes to the serving node.

18. An apparatus for use in providing reverse time alignment in a wireless network, comprising:
    a memory; and
    at least one processor coupled with the memory, wherein the at least one processor and the memory are configured to:
        obtain, at a user equipment (UE), a first timing value from a serving node and a second timing value from each of one or more non-serving nodes of the UE;

compute, at the UE, timing differences between the first timing value and each of one or more second timing values;

report, by the UE, the timing differences to the serving node;

obtain a third timing value from the serving node, wherein the third timing value is a UE specific timing value that is based on the reported timing differences and is different than the first timing value;

synchronize timing at the UE to the third timing value received from the serving node; and receive a coordinated multi-point (CoMP) transmission at the UE from the serving node and the one or more non-serving nodes according to the third timing value, wherein the third timing value addresses propagation delays between at least one of the serving node and the UE or one or more non-serving nodes and the UE.

19. The apparatus of claim 18, wherein at least one of the first timing value or the second timing value are obtained from primary or secondary synchronization signals received from the serving node and the one or more non-serving nodes.

20. The apparatus of claim 18, wherein at least one of the first timing value or the second timing value are obtained from system information block (SIB) messages received from the serving node and the one or more non-serving nodes.

21. The apparatus of claim 20, wherein at least one of the first timing value or the second timing value is obtained from the system information block (SIB) messages, and wherein system information block (SIB) messages comprise a coordinated universal time (UTC).

22. The apparatus of claim 18, wherein at least one of the first timing value or the second timing value are obtained by the UE from measurements in an idle or a connected mode.

23. The apparatus of claim 18, wherein the UE reports the timing differences to the serving node via an uplink control channel, a data channel, or some combination thereof.

24. The apparatus of claim 23, wherein the uplink control channel comprises a physical uplink control channel (PUCCH) and the uplink data channel comprises a physical uplink shared channel (PUSCH).

25. The apparatus of claim 18, wherein the memory and the processor are further configured to:

report at least one propagation delays associated with the serving node or the one or more non-serving nodes to the serving node.

26. The apparatus of claim 18, wherein a multipath delay experienced by the UE for the CoMP transmission is less than a cyclic prefix length.

* * * * *